July 25, 1950  J. N. PATTERSON  2,516,411
BLEED VALVE
Filed Sept. 28, 1948  2 Sheets-Sheet 2
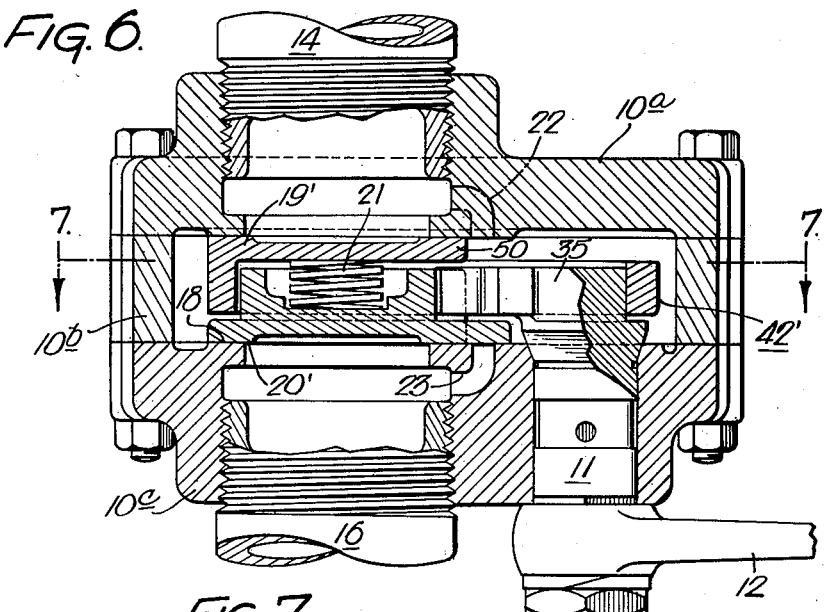
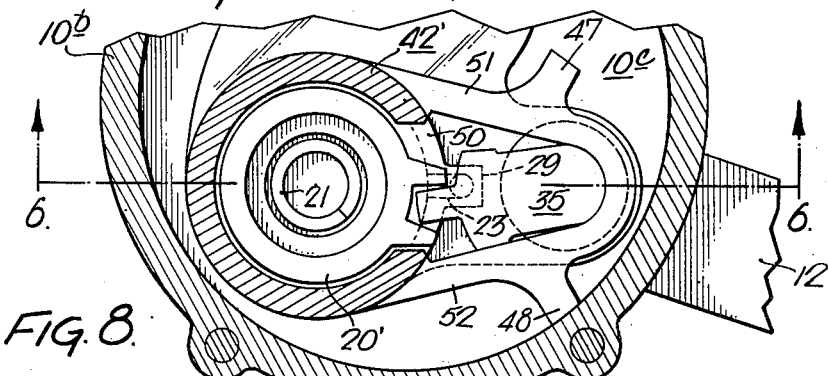
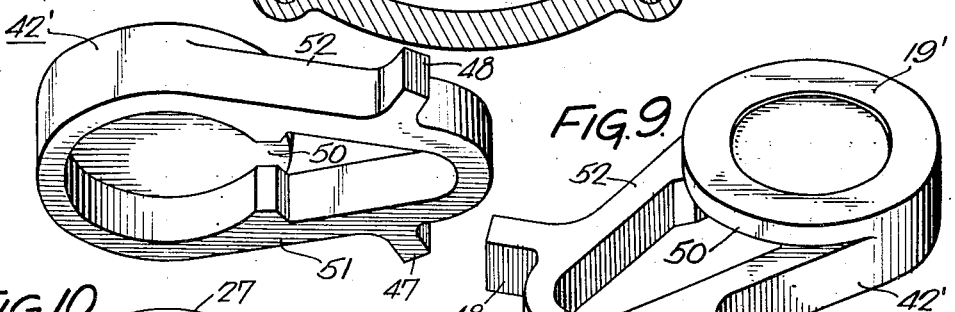
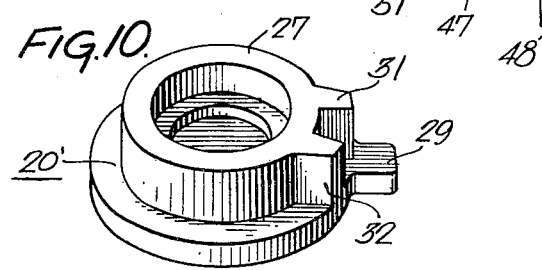
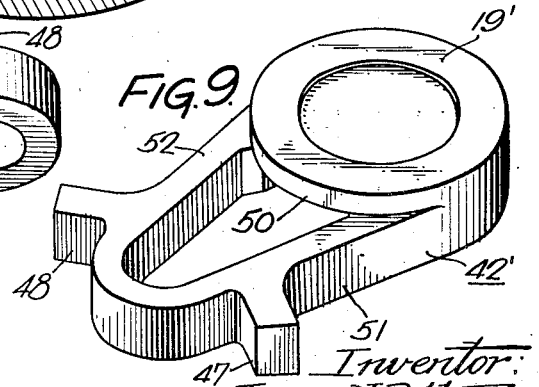
Inventor:
James N. Patterson
by his Attorneys
Howson & Howson

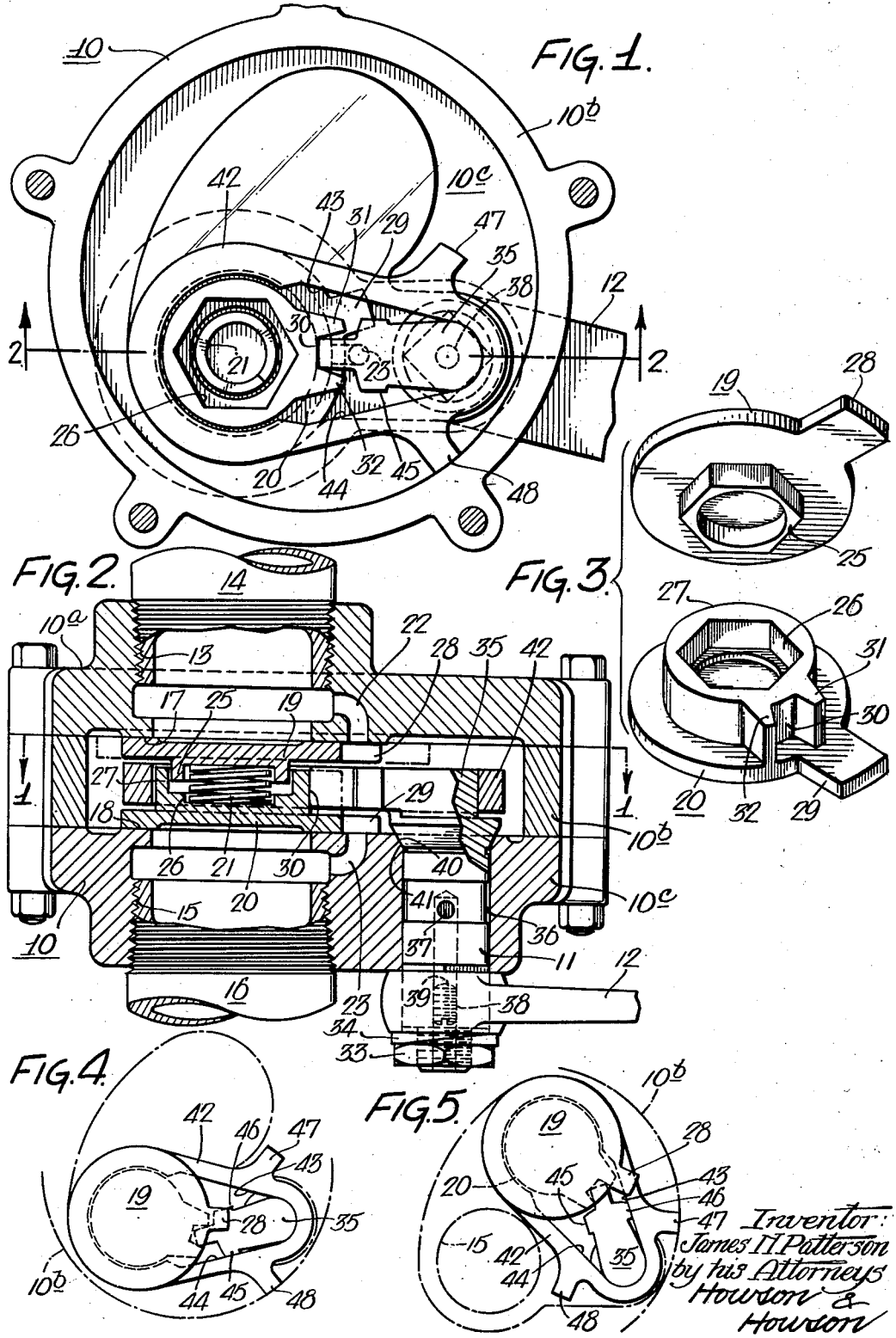

Patented July 25, 1950

2,516,411

UNITED STATES PATENT OFFICE 2,516,411

BLEED VALVE

James N. Patterson, Pitman, N. J.

Application September 28, 1948, Serial No. 51,505

7 Claims. (Cl. 251—18)

This invention relates to quick-acting gate valves adapted for use as boiler blow-off valves or for controlling the flow of liquid or fluid through a pipe in which the valve is connected.

Valves of this type are characteristically provided with a pair of axially aligned spaced ports and a pair of axially aligned circular valve discs arranged to cover said ports respectively and to be swung as a unit in a plane intermediate said ports from a closed position in which the discs are in registry with the ports, to an open position in which the discs are displaced to permit free flow of fluid through the ports and connected conduits.

Frequently such valves are used in steam lines where it is desirable to bleed small amounts of steam or other fluid without any displacement of the discs or gate. In order to bleed the conventional valve, it is necessary that the discs be moved on their seats only a slight amount. This involves two serious disadvantages, the first being that it is difficult to position the discs by means of the lever in such a way that only a small amount of fluid passes through the valve. This difficulty arises from the fact that in a quick-acting valve, when the ports are opened at all, the amount of fluid that instantly passes through the ports is greatly in excess of the proper amount for bleeding. The second disadvantage arises from the fact that if the discs are not moved over their entire travel when the valve is operated, there will be a tendency to wear the ports over a limited portion of their surface which condition will in time cause the valve to leak.

The present invention therefore, has for its primary object the provision of a two-position valve control lever in which limited movement of the lever causes the discs to rotate slightly on the ports, thereby opening a bleed passage. Further pivotal movement of the valve lever or handle will displace the discs bodily and thereby open the valve completely.

Further objects will be apparent from the specification and drawing in which:

Fig. 1 is a transverse section of one embodiment of a valve constructed in accordance with the invention, as seen at 1—1 of Fig. 2;

Fig. 2 is a longitudinal section of the valve structure as seen at 2—2 of Fig. 1;

Fig. 3 is a perspective of the valve discs;

Fig. 4 is a diagrammatic view showing the valve in closed position;

Fig. 5 is a view corresponding to Fig. 4 with the valve in the completely open position;

Fig. 6 is a section similar to Fig. 1 of a slightly modified form of valve construction, as seen at 6—6 of Fig. 7;

Fig. 7 is a fragmentary section as seen at 7—7 of Fig. 6;

Figs. 8 and 9 are perspectives of the modified retainer; and

Fig. 10 is a perspective of a modified disc.

The invention comprises essentially the provision of a pair of spring-loaded valve discs adapted to bear against the axially aligned ports in a valve casing. The discs are slidable on the ports to open and close the valve and in addition, at least one of the discs may be slightly rotated about its center line when in the closed position to open a bleed port which connects the fluid conduits on opposite sides of the valve assembly. A lever is pivotally mounted in the valve casing in such a way that the same lever may be used both to bleed the valve and to open it entirely.

Referring now more particularly to the drawings, the valve casing designated generally by 10 has an upper housing 10a (as seen in Fig. 2), an intermediate or spacing housing 10b, and a lower housing 10c in which the shaft 11 for handle 12 is pivoted. Housing 10a is provided with an internally threaded passage 13 in which pipe or conduit 14 is secured in the conventional manner. Housing 10c is likewise provided with a passage 15 for conduit 16. Passages 13 and 15 terminate internally of the valve assembly in coaxially aligned valve seats 17 and 18 on which the valve discs 19 and 20 are axially positioned by means of a helical compression spring 21. Both housings 10a and 10c are provided with by-pass conduits 22 and 23 which are in axial alignment with each other through casing 10b. Valve disc 19 is provided with a hexagonal boss 25 which cooperates with a hexagonal recess 26 in boss 27 on valve disc 20 for the purpose of preventing relative rotation of the valve discs with respect to each other. Disc 19 also has a radially extending ear 28 which is in effect an enlargement of the valve seat surface of the disc. Likewise, disc 20 has a similar and registering ear 29 which provides a radial enlargement for the valve seat surface of disc 20. Boss 27 on disc 20 has a radially facing notch 30 formed by lugs 31, 32 and by means of which the disc assembly may be actuated to perform the desired valve functions.

Handle 12 is retained on shaft 11 by means of nut 33 and spring washer 34, and a lever 35 is pressed on the opposite end of shaft 11 so that the extremity of lever 35 engages notch 30 on disc 20. Shaft 11 is circumferentially grooved at 36, transversely bored at 37, and axially bored and threaded at 38 for reception of a screw 39 which may or may not project beyond the end of shaft 11. A soft displaceable packing material such as putty, rubber or other plastic, or a heavy packing grease is forced into the bore 38, whereupon screw 39 may be threaded into the bore to further displace lubricant through bore 37 to provide a sealing contact between the casing 10c and shaft 11.

In addition, shaft 11 is provided with an annular beveled face 40 which preferably has a lapped fit with a correspondingly beveled seat 41 in casing 10c whereby fluid leakage around shaft 11 is effectively prevented. Spring washer 34 assists in maintaining proper sealing contact between the beveled face 40 and seat 41.

The large end of pear-shaped hollow retainer 42 is adapted to receive the periphery of boss 27, and the small end of retainer 42 is carried by the inner end of shaft 11. When handle 12 is rotated through a small arc, valve discs 19 and 20 merely rotate in the retainer and for this purpose inner faces 43 and 44 provide suitable limit stops for lugs 45 and 46 on lever 35. When either lug 45 or lug 46 abuts faces 43 and 44 as the case may be, the retainer together with the valve discs pivots as a unit to displace the discs from ports 17 and 18. Lugs 47 and 48 on retainer 42 serve as limit stops for this pivoting movement of the retainer and for this purpose abut the inner face of case 10b, as shown in Figs. 1, 4 and 5. Casing 10b is tightly clamped between casings 10a and 10c by means of bolts 49, 49, thus completing the valve structure.

In operation, handle 12 rotates shaft 11 and actuates lever 35 to cause a displacement of the valve discs 19 and 20 with respect to valve ports 17 and 18 or by-passes 22 and 23. When the handle 12 is turned to its maximum closed position, valve discs 19 and 20 completely cover passages 13 and 15. In addition, ear 28 on disc 19 also covers by-pass 22 in casing 10a, and ear 29 on disc 20 covers by-pass 23 in casing 10c, thereby preventing any flow of fluid through the valve. Figs. 1 and 2 show the position of the discs when limited pivoting of lever 12 takes place from the closed position described above. In this event, discs 19 and 20 are merely rotated about their axes so that ears 28 and 29 uncover by-passes 22 and 23 to permit bleeding or limited fluid connection between conduits 14 and 16. Further downward movement of lever 12 displaces the discs entirely from ports 17 and 18, since lever 35 then abuts the inner face of retaining collar, thereby carrying both discs bodily to a position shown in Fig. 5 which is out of registry with passages 13 and 15.

Obviously, the valve may be closed to either the bleed or the fully tight position merely by reversing the above operation.

Referring now to Figs. 6-10, I have found that in certain applications, especially where relatively high pressure is present, it may be desirable to redesign the pear-shaped retainer in order to provide increased strength and rigidity therefor.

Upper housing 10'a is identical with housing 10a of Figs. 1 and 2 except that port 22 is omitted. The lower housing 10c and spacer 10b are interchangeable in the forms of Figs. 2 and 6. Likewise, shaft 11, lever 35, handle 12 and their relating parts are the same. Retainer 42 however, is replaced with a modified retainer 42' in Figs. 8 and 9, on which one disc valve 19' is integrally formed. This construction provides a reinforcing web 50 which serves to reinforce the side portions 51 and 52 of retainer 42', thereby preventing any distortion or enlargement of these members which may be caused by excessive pressure exerted through lever 35. A modified cooperating valve disc 20' is similar in construction to disc 20 except that the hexagonal recess 26 may be omitted in view of the fact that disc 19' cannot rotate relative to retainer 42'. In operation, the valve of Figs. 6-10 performs in exactly the same manner as the valve of Figs. 1-5 except that when upper casing 10'a has no bleed as shown in Fig. 6, it is important that conduit 14 be connected to the pressure line. In order to bleed the valve of Fig. 6, it is only necessary to move lever 35 sufficiently to open bleed port 23, whereupon pressure in conduit 14 will slightly unseat valve disc 19' and permit limited fluid passage past disc 19' and through bleed port 23.

When the valve is in the completely closed position, pressure against the valve 19' permits it to unseat slightly, thus permitting fluid to enter the valve chamber. This action assists in sealing valve 20' both with respect to the main port 18 and the bleed passage 23.

In the event that a particular installation renders it necessary to discharge through conduit 14 instead of conduit 16, so that conduit 16 becomes the pressure side of the valve, it will be necessary to provide a bleed passage 22 in housing 10'a, thus making it interchangeable with housing 10a. It will be understood, of course, that in this case it is not advantageous to reverse the valve along with the fluid flow in order to avoid breaking the threaded connections between conduits 14 and 16 and the valve casing. Therefore, when the fluid flow is reversed, it will only be necessary to reverse the retainer 42' in the valve chamber so that valve disc 19' will cooperate with valve seat 18 rather than valve seat 17.

It will thus be apparent that I have provided a bleed valve assembly which is relatively inexpensive to manufacture and by which accurate and controlled bleeding is readily provided without the necessity of attempting to regulate bleeding by means of the main ports 17 and 18. The valve is adapted for long and hard service and may be utilized under a variety of operating conditions.

Having thus described my invention, I claim:

1. A valve structure comprising a casing having a pair of oppositely disposed ports, a pair of valve seats respectively encircling said ports in relatively spaced parallel planes, a passage in said casing adapted to by-pass one of said ports, a valve unit intermediate said planes and including a pair of discs bearing flatly against the said seats respectively to selectively close said main ports and said by-pass passage, and means including a lever for selectively rotating at least one of the discs to open and close the by-pass passage and for bodily displacing the discs from the valve seats to open and close the ports.

2. A valve structure comprising a casing, having a pair of oppositely disposed ports, a pair of valve seats respectively encircling said ports in relatively spaced parallel planes, at least one passage connected to one of said ports and adapted to by-pass its associated port, a valve unit intermediate said planes including a pair of discs bearing flatly against the said seats respectively to close said main ports, an extension on one of said discs adapted to close the by-pass passage, and means for selectively rotating at least one of the discs and bodily displacing both of the discs from the valve seats.

3. A valve structure comprising a casing having a pair of oppositely disposed main ports, a pair of main valve seats respectively encircling said ports in relatively spaced parallel planes, a by-pass valve seat in radial displacement from said main ports and in the plane of said first valve seats and connecting with a by-pass passage around one of said main ports, a valve unit intermediate said seats and including a pair of discs bearing flatly against the said valve seats and by-pass seat, a notch on one of said discs, a lever pivoted in said casing and adapted to engage said notch, means for pivoting said lever to rotate the notched disc with respect to the valve unit and to displace the valve unit and discs bodily from the main valve seats, and at least one limit stop for pivotal movement of the valve unit with respect to the seats.

4. A valve structure comprising a casing having a pair of oppositely disposed main ports, a pair of main valve seats respectively encircling said ports in relatively spaced parallel planes, a passage in said casing adapted to by-pass one of said main ports, a by-pass valve seat encircling said by-pass port, said by-pass valve seat being radially displaced from the main valve seats, a valve unit intermediate said seats and including a pair of spring-loaded discs adapted to cooperate with the main valve seats and the by-pass valve seat, means including a lever for rotating said valve unit on the main valve seats to open and close the by-pass valve port, a retainer adapted to enclose the valve unit and the lever, a pair of limit stops on said retainer whereby rotation of the lever within the limit stops serves to open and close the by-pass ports, and a pair of limit stops on the outer periphery of the retainer for limiting pivotal movement of the valve unit retainer and lever as a whole.

5. A valve structure comprising a casing having a pair of oppositely disposed ports, a pair of valve seats respectively encircling said ports in relatively spaced parallel planes, a pair of oppositely disposed by-pass ports in said casing, a valve unit intermediate said planes and including a pair of discs bearing flatly against the said seats respectively to close said main ports, an extension on each of said discs, said extensions adapted to close the by-pass ports, and means for selectively rotating the discs and bodily displacing them from the valve seats.

6. A valve structure comprising a casing having a pair of oppositely disposed main ports, a pair of main valve seats respectively encircling said ports in relatively spaced parallel planes, a pair of by-pass ports internally connected with said main ports, a pair of by-pass valve seats encircling said by-pass ports, said by-pass valve seats being offset with respect to the main valve seats, a valve unit intermediate said seats and including a pair of spring-loaded discs adapted to cooperate with the main valve seats and the by-pass valve seats, means including a lever for rotating said valve unit on the main valve seats to open and close the by-pass valve ports, and at least one limit stop for said lever whereby the discs may be rotated upon the main valve seats by means of limited movement of the lever, and additional movement of the lever serves to translate rotation of the discs into tangential displacement thereof with respect to the ports.

7. A valve structure comprising a casing, having a pair of oppositely disposed ports, a pair of valve seats respectively encircling said ports in relatively spaced parallel planes, at least one radially disposed passage adapted to by-pass one of said ports, a valve unit intermediate said planes and including a pear-shaped retainer having a disc formed integrally therewith, a second disc mounted rotatably in said retainer and in registry with the first disc, the discs having oppositely disposed valve surfaces adapted to cooperate with said valve seats respectively to close said main ports, an extension on said rotatable disc adapted to close the by-pass passage, and means including a lever and a handle for turning the rotatable disc with respect to the retainer and also for bodily displacing the retainer and both discs from the main ports.

JAMES N. PATTERSON.

REFERENCES CITED

The following references are of record in the file of this patent:

UNITED STATES PATENTS

| Number | Name | Date |
|--------|------|------|
| 711,262 | Riegler | Oct. 14, 1902 |
| 1,436,412 | Skiffington | Nov. 12, 1922 |
| 2,297,797 | Oetiker | Oct. 6, 1942 |
| 2,443,929 | Patterson | June 22, 1948 |